US009869079B2

(12) United States Patent
Boodaghians et al.

(10) Patent No.: US 9,869,079 B2
(45) Date of Patent: Jan. 16, 2018

(54) ACCUMULATOR FOR WATER MANAGEMENT

(71) Applicant: MAG Aerospace Industries, LLC, Carson, CA (US)

(72) Inventors: Razmik B. Boodaghians, Glendale, CA (US); Salvador Padilla, Del Aire, CA (US); Christina Ortolan, Long Beach, CA (US); Nguyen Tram, Chino Hills, CA (US); Timothy Birbeck, Torrance, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 14/731,689

(22) Filed: Jun. 5, 2015

(65) Prior Publication Data

US 2015/0361648 A1 Dec. 17, 2015

Related U.S. Application Data

(60) Provisional application No. 62/011,229, filed on Jun. 12, 2014.

(51) Int. Cl.
*E03D 1/14* (2006.01)
*E03D 5/01* (2006.01)
(Continued)

(52) U.S. Cl.
CPC ............... *E03D 5/01* (2013.01); *B64D 11/02* (2013.01); *E03D 3/10* (2013.01); *E03D 5/003* (2013.01);
(Continued)

(58) Field of Classification Search
USPC ............................................................ 4/354
See application file for complete search history.

(56) References Cited

U.S. PATENT DOCUMENTS 4,063,315 A    12/1977   Carolan et al.
4,707,868 A *   11/1987   Hennessy ................. E03D 3/10
                                                                   4/354

(Continued)

FOREIGN PATENT DOCUMENTS

WO      2006040546 A1    4/2006

OTHER PUBLICATIONS

PCT/US2015/034382, Search Report and Written Opinion dated Sep. 23, 2015.

(Continued)

*Primary Examiner* — Lauren Crane
(74) *Attorney, Agent, or Firm* — Kilpatrick Townsend & Stockton LLP; Dean W. Russell; Kristin M. Crall

(57) ABSTRACT

Embodiments of disclosure provide an intermediate accumulator that can receive and hold water prior to its delivery to a vacuum toilet or other water-using source. The pump required to move water from the reservoir to the intermediate accumulator can be much lighter and smaller than pumps previously required in systems that do not use an intermediate accumulator. Providing an intermediate accumulator can provide a more constant flush by holding the pressure inside the accumulator more constant, by equalizing the pressure, and by lowering the total volume required per flush. The accumulator can store energy in the water and deliver it to a water-using source using less energy and requiring less volume.

6 Claims, 15 Drawing Sheets

(51) Int. Cl.
*B64D 11/02* (2006.01)
*E03D 3/10* (2006.01)
*E03D 5/00* (2006.01)
*E03F 1/00* (2006.01)
*F15B 1/04* (2006.01)

(52) U.S. Cl.
CPC ............... *E03F 1/006* (2013.01); *F15B 1/04* (2013.01); *Y02T 50/46* (2013.01)

(56) References Cited

U.S. PATENT DOCUMENTS

| 5,487,193 | A | * | 1/1996 | Hennessy | ............... | E03D 3/10 |
|---|---|---|---|---|---|---|
| | | | | | | 222/341 |
| 6,085,366 | A | | 7/2000 | Pondelick et al. | | |
| 7,533,426 | B2 | | 5/2009 | Pondelick | | |
| 2003/0145370 | A1 | * | 8/2003 | Lee | ............... | E03D 3/10 |
| | | | | | | 4/354 |
| 2013/0305444 | A1 | | 11/2013 | Boodaghians et al. | | |
| 2014/0059754 | A1 | * | 3/2014 | Hermon | ............... | E03D 5/003 |
| | | | | | | 4/318 |

OTHER PUBLICATIONS

Whale Marine Products, Whale Accumulator Pump and 2 ltr Tank Kit, http://www.whalepumps.com/Marine/product.aspx?Category_ID=10015&Product_ID=10324&FriendlyID=NEW-Whale-Accumulator-Pump-and-21tr-Tank-Kit.
InspectAPedia, Bladder Type Water Storage & Pressure Tanks: Diagnosis & Repair, http://inspectapedia.com/water/Water_Tank_Bladders.htm.

\* cited by examiner

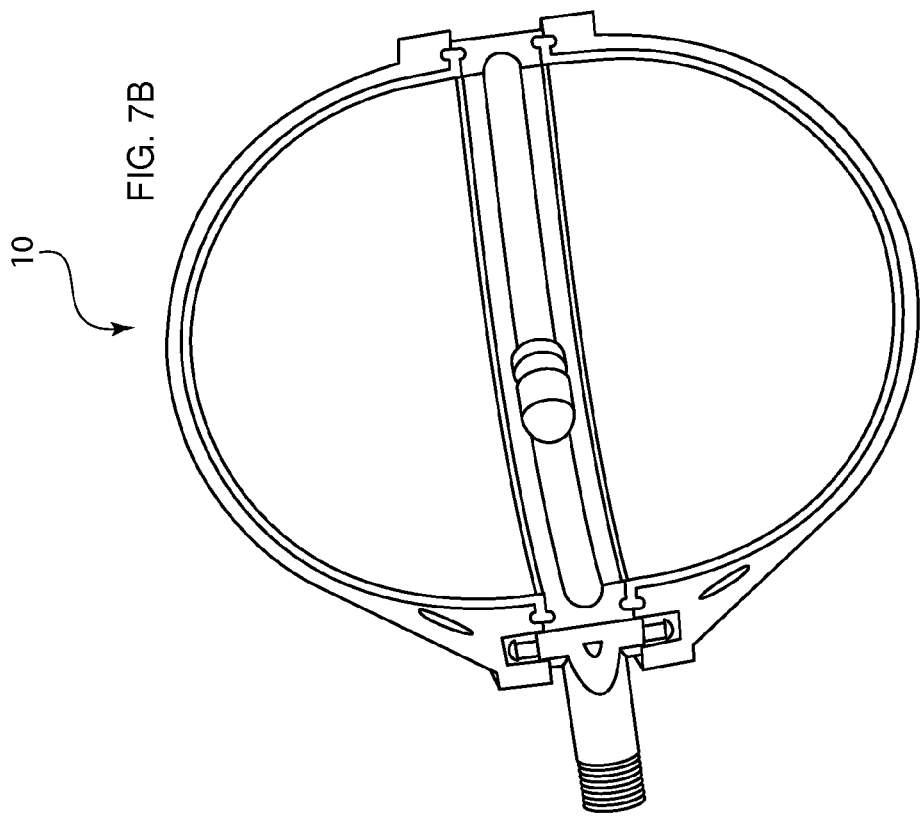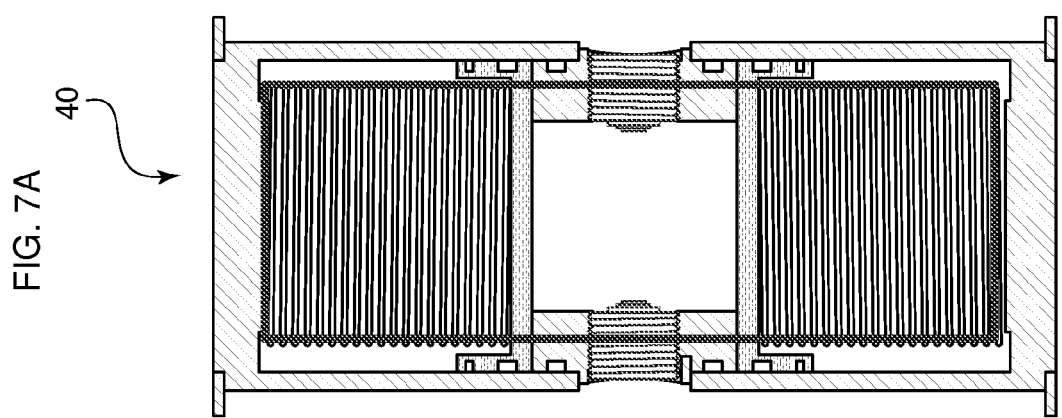

FIG. 10A
40
FIG. 10B
40
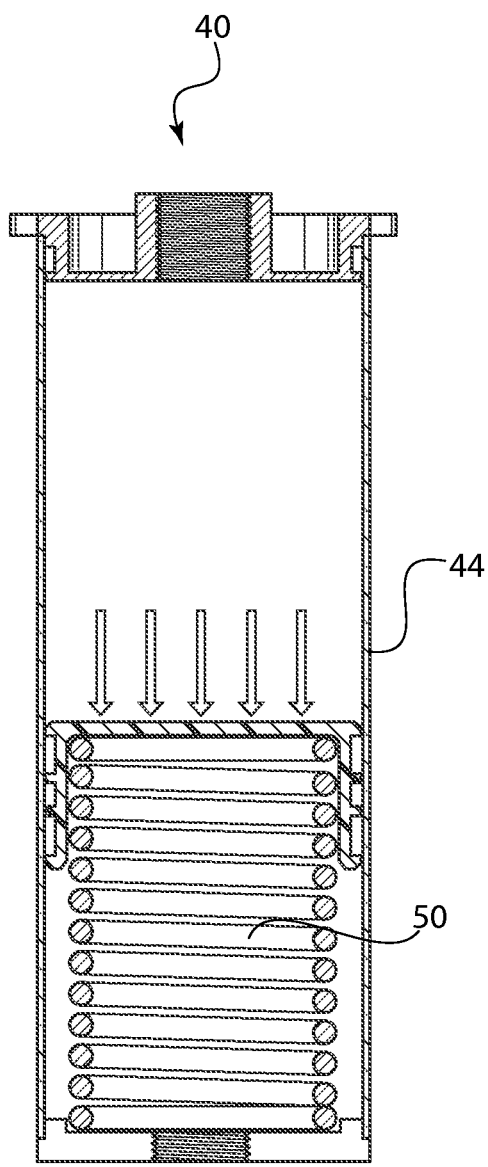
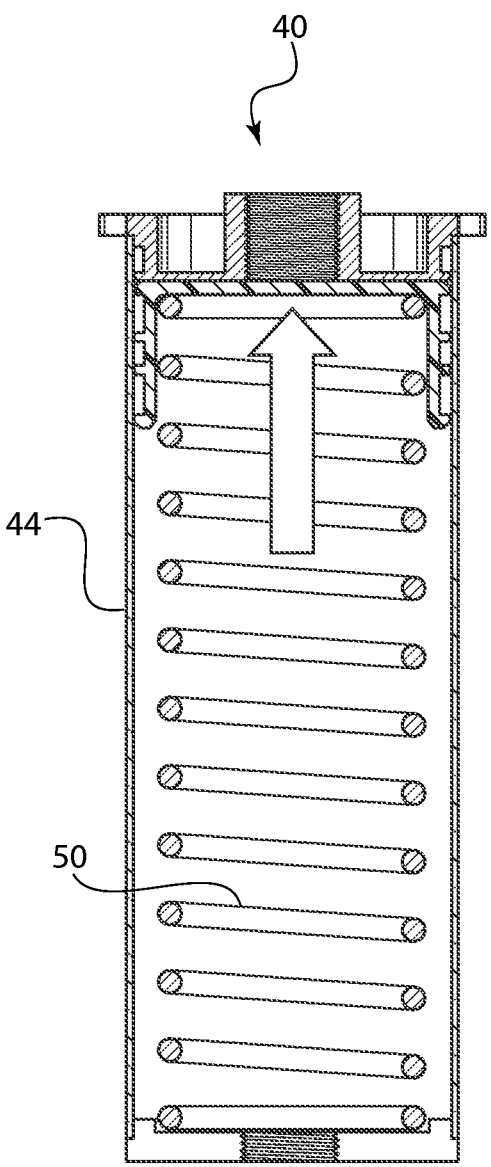
FIG. 10

ACCUMULATOR FOR WATER MANAGEMENT

This application claims the benefit of U.S. Provisional Application Ser. No. 62/011,229, filed Jun. 12, 2014, titled "Accumulator for Water Management," the entire contents of which are hereby incorporated by reference.

FIELD OF THE DISCLOSURE

Embodiments of the present disclosure relate generally to systems for managing water flow through a vacuum water and waste system. Certain embodiments find particular use on-board passenger transport vehicles, such as aircraft. Certain embodiments seek to reduce pump strain and/or are designed to allow use of a smaller and lighter pump for moving water from a water reservoir to a vacuum toilet.

BACKGROUND

Many types of passenger transport vehicles (such as aircraft, ships, buses, trains, and any other passenger transport vehicles) use vacuum toilets in order to flush septic waste, which is then delivered to a septic holding tank on board the vehicle. Such septic holding tanks are typically fluidly connected to the vacuum toilet system via a series of conduits, valves, and vacuum pumps in order to flush and route septic waste to the holding tanks The vacuum created for the flushing action may either be via one or more vacuum pumps, or, in the case of an aircraft in flight, via a pressure differential. For example, aircrafts typically have a vacuum disposal system that applies a vacuum to push waste media and flush water/spent water from toilets and/or sinks into an on-board waste water storage tank. The suction is generated either by the pressure differential between the pressurized cabin and the reduced pressure outside of an aircraft at high flight altitudes or by a vacuum generator at ground level or at low flight altitudes.

Although efficient, vacuum toilets create a loud noise level during the flush cycle, due to the amount of vacuum that needs to be applied in order to cause the septic waste to travel from the toilet basin to the holding tank. A loud flushing sound is created when the flush valve opens; the differential pressure is what forcefully draws the waste down the drain, and the pressure differential must be large enough to cause the waste to flow the entire distance from the toilet basin to the septic holding tank, which can be located quite far from the lavatory.

In addition to vacuum toilets, passenger lavatories also contain sinks for hand washing. For example, most commercial aircraft are equipped with galley and lavatory sinks These sinks are typically intended for the disposal of fluid waste, soiled water from hand washing, and so forth. The spent water from sinks is referred to as "grey water," as opposed to "black water" which has a urine or fecal component. (In addition to hand-washing water overflow from the lavatory, grey water can also include water from galley sinks Fluids from the galley can contain items such as leftover portions of beverages and water from melting ice, or any other form of "used" or spent water that drains from the water system. Grey water can also drain from wash basins during hand washing, or any other instance in which water is soiled or loaded with waste, such as e.g., soaps, detergents, soils from hand washing, and so forth). These sinks are typically connected to small diameter drain lines (which can easily back up if clogged) and may either terminate at the aircraft drain mast for exhaustion to the atmosphere or may be delivered to a grey water holding tank.

Although most large passenger transport vehicles are equipped with a grey water system for collecting, storing and ultimately disposing of grey water, providing a separate grey water holding tank is not always economical due to the additional weight that such systems add to the aircraft. (In the absence of special valves, such as those described by U.S. Pat. No. 7,533,426 titled "Grey Water Interface Valve Systems and Methods," health standard guidelines for airlines require that septic water ("black water") be vacuumed away separately from grey water because, if a back-up were to occur, sewage would be expelled from galley and lavatory sinks, as well as toilets, which could create a myriad of health problems.) Accordingly, the added expense of keeping grey and black water separate has generally been necessary. The present assignee has sought to provide ways to re-use the grey water in connection with a toilet basin flush system. Although vacuum toilets use much less water than a typical gravity flow toilet, it is still desirable to find a way to re-use the spent/grey water rather than using fresh water for each flush cycle, due to cost and weight considerations of maintaining fresh water on-board.

The present assignee has also sought to reduce the noise associated with vacuum flushing. Some of the advances that focus on solving these problems are described in co-pending application 2013/0305444, titled "Two-Stage Flush and Grey Water Flush Systems and Devices." In this application, grey water is held in a reservoir and is delivered to the vacuum toilet when a flush sequence is demanded. (The present assignee has also explored various ways to clean grey water prior to its deliver to the vacuum toilet, which are described in co-pending application U.S. Ser. No. 14/081,089, titled "Mixed Fluid Filtration.")

One of the challenges that has developed with the process of holding the grey water in a reservoir (prior to its delivery to the vacuum toilet) has been that the pump used to force water from the reservoir to the toilet must have certain features. For instance, the pump must be strong enough to move the required amount of water from the reservoir to the toilet, with sufficient force and pressure. This has generally required a pump having a certain weight and certain size, in order to meet the requirements. (For example, the pump generally includes a device that turns the pump on and off, depending on the fluid level of the media. Its operation may be guided by parameters such as flow, pressure, and any safety shutoff features. The pump should create and maintain a sufficient vacuum level to draw fluid into the inlet (self-priming feature) without external assistance. The pump can operate without pumped fluid for a given period of time without damaging the equipment or system. The pump is capable of pumping viscous, sticky, or stringy materials that may clog other types of pumps.) It is, however, desirable to reduce the weight and size of the pump required.

BRIEF SUMMARY

Embodiments of the invention described herein thus provide an intermediate accumulator that can receive grey water from the reservoir (generally once the grey water has been filtered or otherwise cleaned) and hold a desired amount of grey water prior to its delivery to a vacuum toilet. The pump required to move water from the reservoir to the intermediate accumulator can be much lighter and smaller than pump previously required by vacuum toilet systems that do not use an intermediate accumulator.

Embodiments also address challenges that are experienced with maintaining pressure along a vacuum line. Providing an intermediate accumulator may help maintain a positive pressure in the system. By stabilizing the standing pressure, the system can rely less on the pump. Thus, even if the accumulator pump remains in an "on" position, the pump itself can be a lower speed, lower flow pump (and thus a lower weight and/or a lower cost pump). Particular challenges with a vacuum toilet line include that the speed at which the flush valve must open and close in order to obtain a proper handshake with the pressure in the line is quite fast and must be precise. Because the timing can be important, providing an intermediate accumulator can assist by allowing the timing to be less precise.

Additionally, providing an intermediate accumulator can provide a more constant flush by holding the pressure inside the accumulator more constant, by equalizing the pressure, and by lowering the total volume required per flush. By contrast, use of a high flow pump can require a higher flush volume, higher speeds, and is more dependent upon pump selection.

BRIEF DESCRIPTION OF THE DRAWINGS

FIG. 6A shows a top plan view. FIG. 6B shows a side cross-sectional view. FIG. 6C shows a side plan view. FIG. 6D shows a cross-sectional view of FIG. 6C. FIG. 6E shows an alternate top plan view. FIG. 6F shows a cross-sectional view along the arrows of FIG. 6E. FIG. 6G shows an alternate view of FIG. 6B.

FIG. 7 shows a comparison between a bladder design accumulator and a spring design accumulator. FIG. 7A shows a spring accumulator. FIG. 7B shows a bladder design accumulator.

FIG. 10 shows a cut-away view of an interior of the accumulator of FIG. 8. FIG. 10A shows the spring in a compressed state. FIG. 10B shows the spring in an extended state.

DETAILED DESCRIPTION

Figure 1:
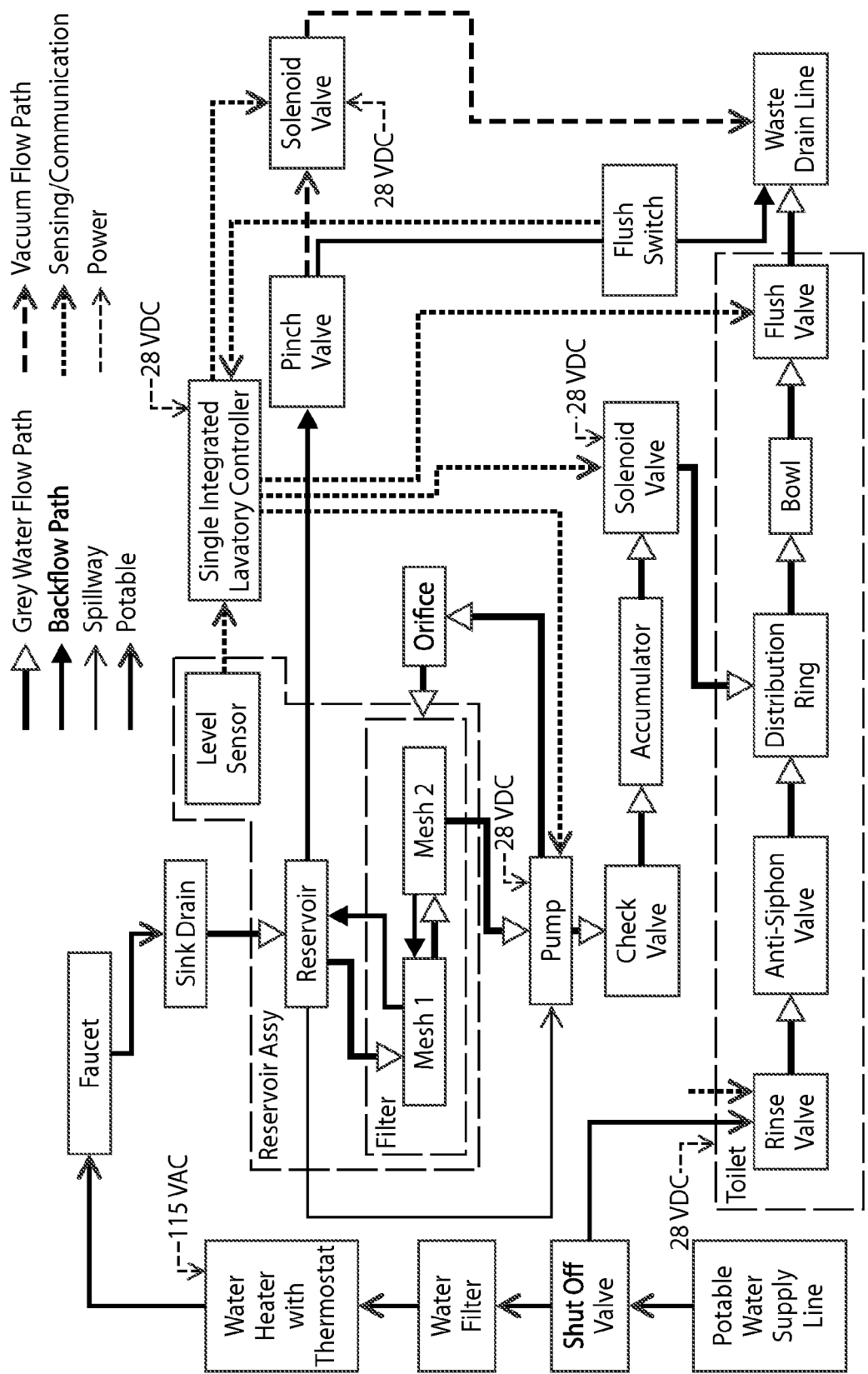
FIG. 1 shows a block diagram schematic of the management of water through a flush system.

Embodiments of the present disclosure may be used for a vacuum waste system on-board an aircraft. Particular embodiments may be used for managing grey water using an accumulator. The accumulator may also be used to help manage potable water, particularly in the event that the grey water reservoir for the system is low or empty. Particular embodiments also relate to managing water in relation to a vacuum toilet flush.

One benefit of the accumulator described herein is that it can allow the use of a smaller and lighter pump to move water through the system. In general, pumps that are used to run grey water flush systems can be rather large and relatively heavy due to the high flow rate that such pumps need to manage. A grey water flush system generally collects grey water from hand-washing uses, or other uses in which used water or liquid exits though a drain. The grey water may be collected in a reservoir.

Once filtered (and/or otherwise cleaned), the grey water can be delivered to a toilet for toilet flushing purposes. This process allows for recycling of water (particularly on-board a vehicle), which saves weight. Less fresh potable water needs to be carried on-board the vehicle, which in turn leads to lower fuel consumption and costs.

The attached figures show various embodiments of potential accumulator designs, as well as potential ways for an accumulator to be integrated into a potable/grey water or a vacuum toilet flushing environment. The accumulator provides a housing location that is designed to hold at least a minimum amount of water that is used for a single toilet flush, although the accumulator may hold more or less water.

Current systems that use potable/grey water for toilet flushing employ a pump that directs the potable/grey water to a vacuum toilet via a rinse valve and anti-siphon valve. (An anti-siphon valve is present to prevent mixing of potable water with grey water.) The pump is generally required to meet a certain set of conditions, which include flow rate, pressure, and durability against the nature of grey water. The pump must also be able to accommodate a number of toilet flushes as function of time and demand. These requirements limit the pump to one that has certain properties that can accommodate and maintain such flow rates and pressure, such as size, power requirement, pressure and flow profiles.

The present disclosure relates to an accumulator that can relieve the pump of some of the above requirements. Providing an accumulator in the system can remove and/or replace some of the requirements of the pump. In one instance, providing an accumulator in communication with a grey water flush system (as shown in the attached flowchart of FIG. 1) allows use of a pump that is smaller in size and/or weight. It can allow the use of a pump that does not require the high flow rate and pressure (as is required in the current systems that do not use an accumulator). Use of an accumulator can in turn help improve the life expectancy of the pump, as well as lower its power consumption. In certain embodiments, the pump may operate on-demand and potentially eliminate the need for a rinse valve. (The on-demand requirements for a pump on a system without an accumulator are generally more demanding than when an accumulator is provided in connection with the system.) Use of an accumulator can also assist with lowering the speed at which the flush valve of a vacuum toilet needs to open and close because a pre-stored amount of water may be delivered. This can alleviate the need for precise timing for opening and closing the vacuum line. Use of an accumulator can also provide a more consistent flush. The pressure can be held inside the accumulator and the accumulator can push the volume of water to be used in the flush.

The flowchart of FIG. 1 shows one example of water flow through a system. Water leaves the potable water supply line and (after some optional treatments) is delivered to a faucet. Once used, the water (filled with hand washing soap and other soils) exits the sink basin through a faucet drain and is held in a reservoir. Before being delivered for a flush, various treatments may be applied to clean the water in order to remove the detergents, soils, or other bacteria that may collect. The treatments may involve passing the fluid through one or more meshes, delivering treatment chemicals to the fluid, and/or treating the water with UV irradiation in order to kill bacteria in the fluid. (One specific example of a filtering/cleaning system is described in co-pending application U.S. Ser. No. 14/081,089, titled "Mixed Fluid Filtration," although the embodiments described herein may be used with other cleaning systems or without a cleaning system if desired.)

When the cleaned grey water leaves the reservoir, it may be delivered to an accumulator via a pump. (The flowchart of FIG. 1 shows 28 VDC for most electrically driven devices. It should be understood that the specific voltage required and the AC and/or DC power supply/source would be matter of choice depending to the required configuration of the system.) A check valve may be provided between the pump and the accumulator to prevent water from flowing back into the pump. The check valve may be associated with the pump, with the accumulator, or it may be a separate stand-alone valve (as shown).

The accumulator may be referred to as an intermediate accumulator, as it provides an intermediate location for holding the water between its residence in the initial reservoir and its delivery to the vacuum toilet for a flush. When a flush is called for by the toilet, the cleaned grey water can be delivered to the toilet for a flush. If the grey water is held in an intermediate accumulator (between its residence time in the reservoir and its delivery to the toilet), some of the above-referenced advantages can be achieved—namely, the use of a smaller and lighter (and possibly less expensive) pump. Downstream of the accumulator is a second valve. In some embodiments, this second valve may be a solenoid valve. It should be understood that although the grey water option is referenced in order to help improve water usage on-board the passenger transport vehicle, it should be understood that an accumulator may be used in connection with a fresh water supply as well. The pressure, speed, volume, and weight advantages described herein may still be achieved by using fresh water for the vacuum toilet flush.

Referring now to the accumulator, a desired amount of water may be held in the accumulator. As described below, there are various ways that the accumulator may build up pressure for delivering the water being held to the toilet when a flush sequence is activated. Whatever option is used, the general goal is for the accumulator to build up sufficient pressure that allows it to deliver water to the toilet bowl at a sufficient force over time (e.g., flow rate), pressure, and volume for the delivered water to clean the toilet bowl in the desired manner (typically using an air/knife effect for vacuum toilets). By using the intermediate accumulator between the pump and the toilet, some of the duties of the pump can be handled by the accumulator.

Although the flow chart schematic of FIG. 1 shows the water flowing through the system as grey water (e.g., used water from the faucet and sink drain), it should be understood that the reservoir may also be configured to push fresh water directly from the potable water supply line. This may occur if there is insufficient grey water from hand washing in the reservoir than is needed for toilet flushing. For example, if the liquid level in the reservoir is low or drops to a pre-defined level, it may send a request to have potable water added thereto. Alternatively or additionally, it should also be understood that the accumulator itself may be configured to push fresh water directly from the potable water supply line if desired. Thus, the accumulator can function with potable water only and/or with grey water only and/or with a mixture of both. These options may be dictated by the amount of liquid in the reservoir as detected via a liquid level sensor. Alternatively or additionally, these options may be dictated by the amount of liquid in the accumulator as detected via a liquid level sensor.

FIGS. 2-5 show one embodiment of a potential accumulator 10. This accumulator design provides a housing 12 that contains a bladder system 14. In one embodiment, the housing includes a first portion 16 and a second portion 18. These portions 16, 18 may fit together to create the housing 12 that functions as a vessel to hold pressure. In one embodiment, the bladder system 14 may include a first bladder portion 20 and a second bladder portion 22. Portions 20, 22 can collectively function to hold and move a volume of water through the accumulator housing 12. Portions 20, 22 can also function as a seal interface.

The accumulator 10 also has a manifold 24 that functions as a sealing interface between housing portions 16, 18. The manifold is shown as having one or more fluid ports 26. These fluid ports 26 may serve as fluid inlet/outlet ports. One or more O-rings or other sealing interface components may be used to create a fluid (liquid and air) tight seal for the housing 12.

Figure 2:
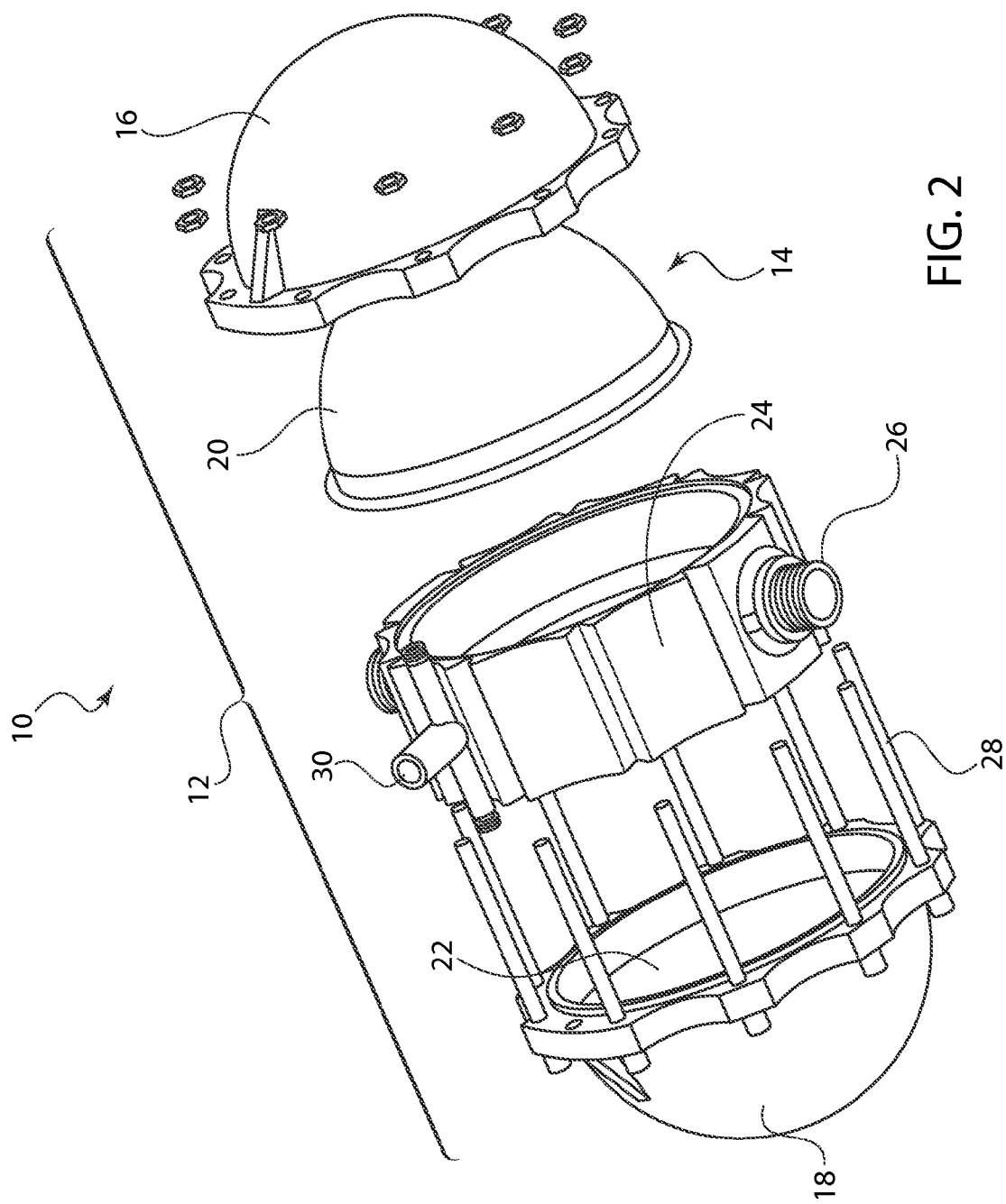
FIG. 2 shows a blown apart side view of one embodiment of an accumulator that uses a bladder system for use in the water flow system of FIG. 1
Figure 3:
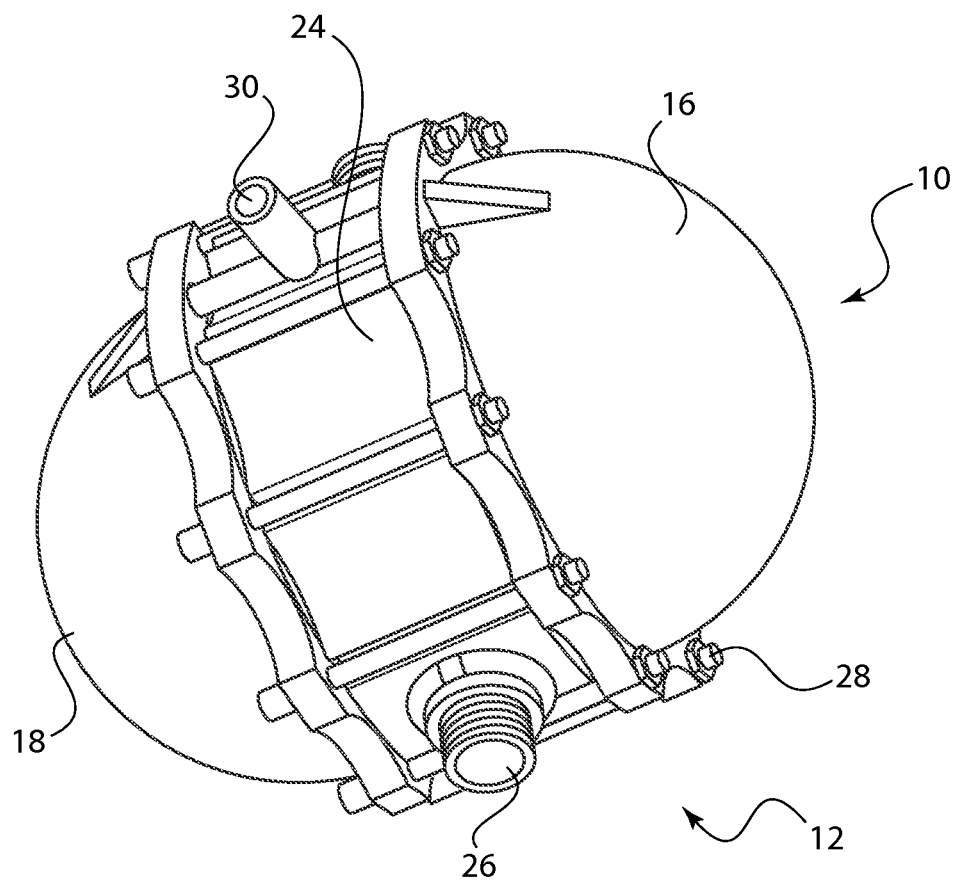
FIG. 3 is an assembled accumulator of FIG. 2.

As shown in FIGS. 2 and 3, a series of fasteners 28 may be provided to secure the first portion 16, the second portion 18, and the manifold 24 of the housing 12 together in order to house the bladder system 14. Any type of fastener is possible and considered within the scope of this disclosure. Non-limiting examples include screws, washers, nuts, or fasteners that distribute sealing loads.

Figure 5:
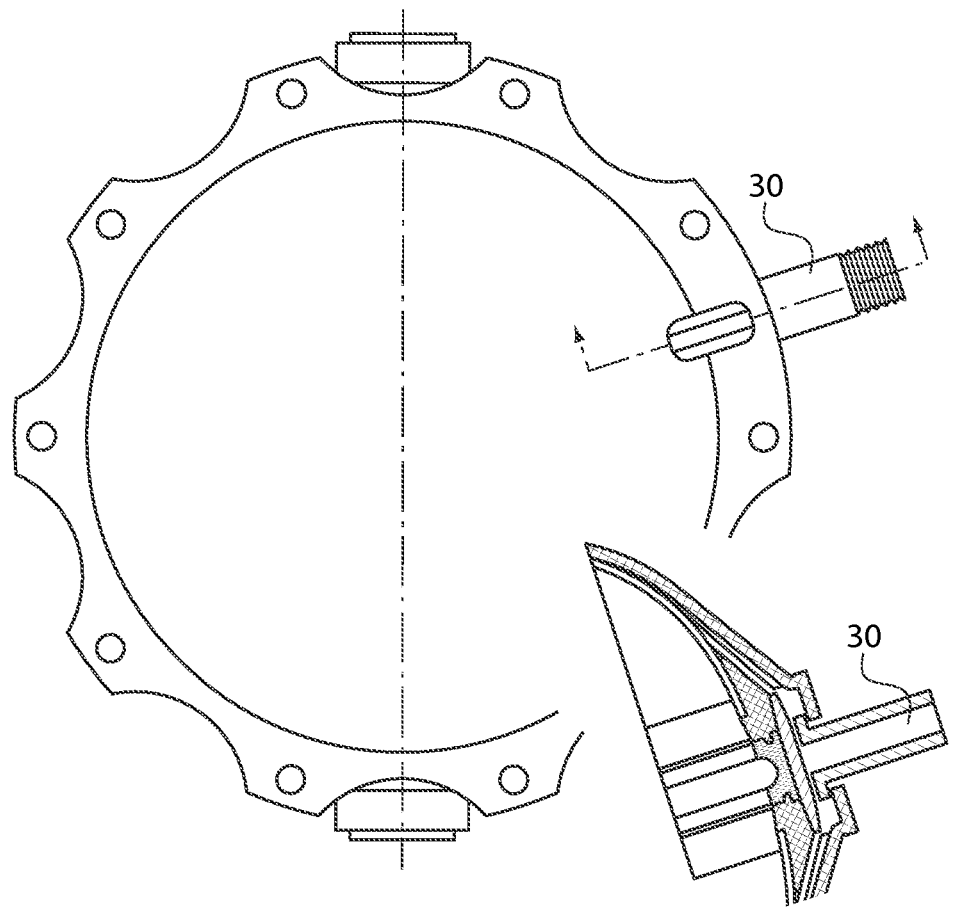
FIG. 5 shows a view of one embodiment of an air path into and out of the accumulator of FIG. 2.
Figure 6:
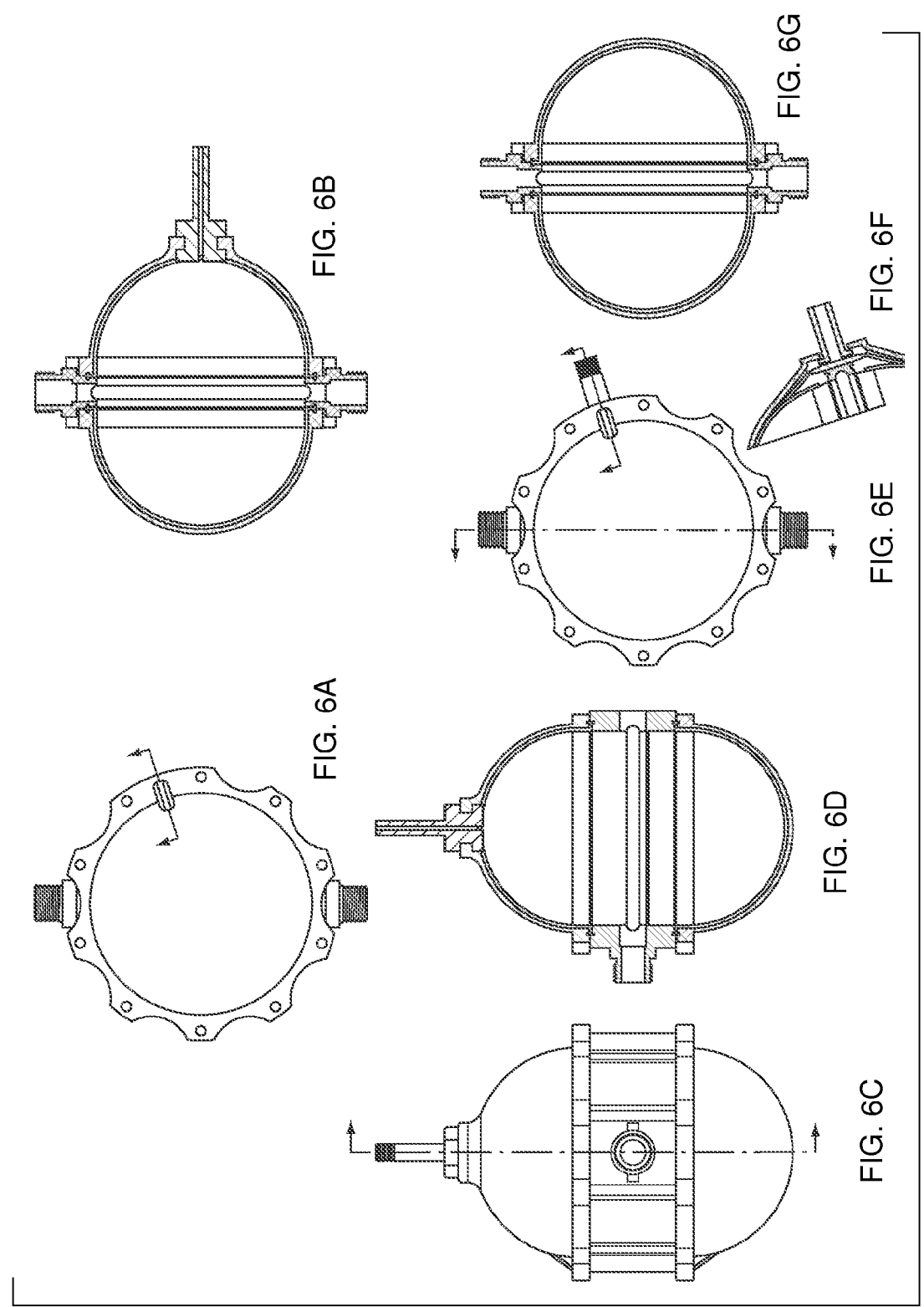
FIG. 6 shows various views of the accumulator of FIG. 2.

An air distributor port 30 is also provided as a component of the accumulator 10. This port 30 may be provided as a Schrader tee, or as any other appropriate port that can create an air path, as shown in FIG. 5.

Figure 4:
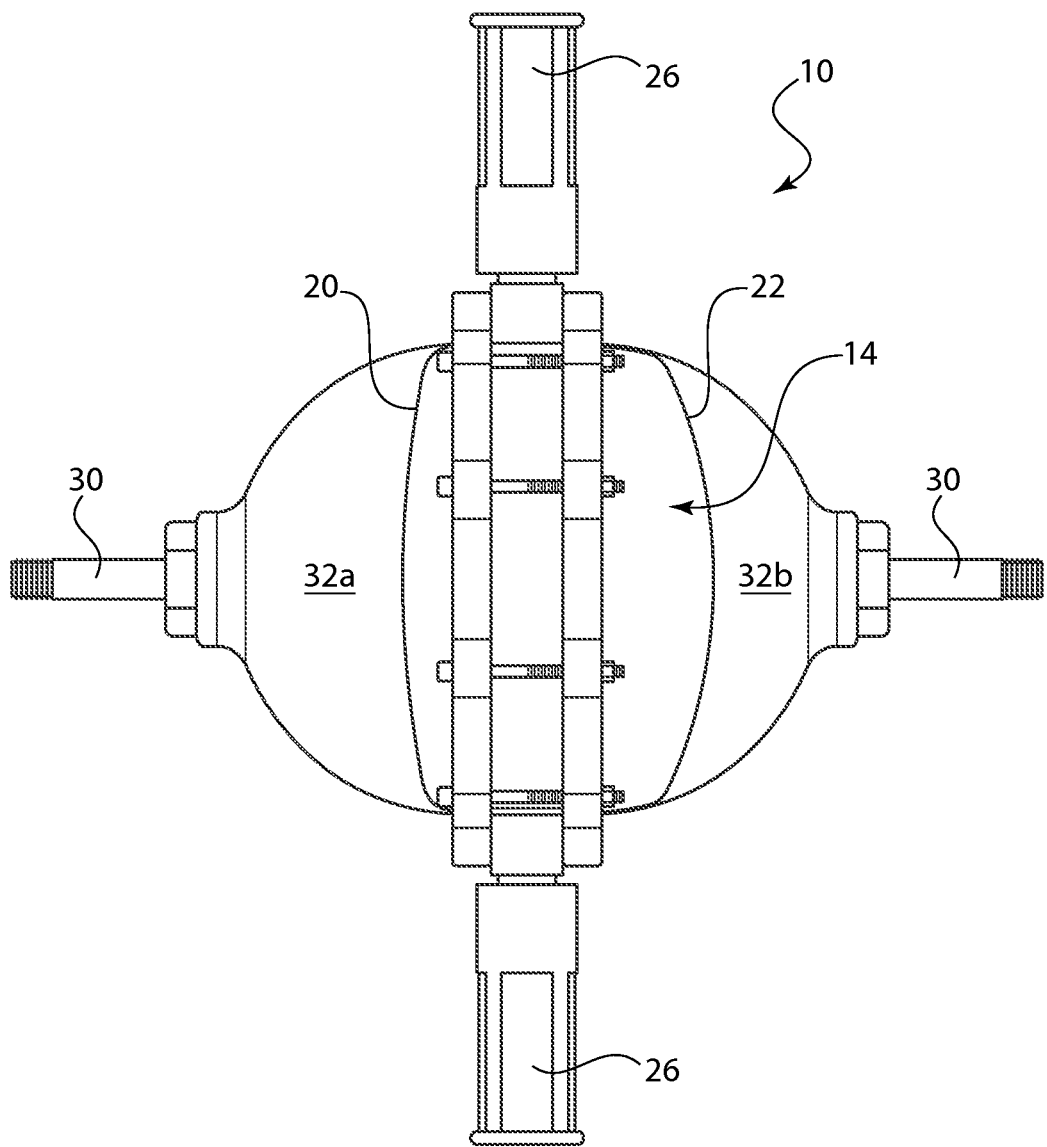
FIG. 4 is a cut away view of an accumulator of FIG. 2, showing internal pressurized air cavities and a bladder.

As shown in FIG. 4, when the bladder system 14 is compressed, the accumulator 10 provides one or more pressurized air cavities 32. In the embodiment shown, there is a first air cavity 32a located on one side of the first bladder portion 20, and a second air cavity 32b located on a side of the second bladder portion 22. Water may be delivered into the bladder system 14 via the pump, via the one or more fluid ports 26. This delivery of water causes the bladder system 14 to expand, which can help further compress the air cavities to build pressure. Once the valve downstream of the accumulator 10 is opened, the built-up pressure from the air cavities 32 helps force the water at the desired rate/pressure into the toilet distribution ring for the flush.

The material selected for the bladder system 14 should be of sufficient strength that it can withstand contraction and expansion under various and extreme pressure and temperature environments (including below freezing temperatures and very high temperatures). The material should be able to withstand cyclic performance at high pressures without being perforated. The material should thus have sufficient integrity that it can withstand repeated uses over extended periods of time, without the need for maintenance or replacement.

In a specific embodiment, the bladder portions 20, 22 may be made of a rubber or rubber-like, expansible material. One example of a material that may be used to form one or both of the bladder portions is EPDM rubber (ethylene propylene diene monomer (M-class) rubber). EPDM rubber is a type of synthetic rubber. It is an elastomer material having a saturated chain of the polymethylene type (a terpolymer of ethylene, propylene and a diene-component). Dienes currently used in the manufacture of EPDM rubbers are dicyclopentadiene (DCPD), ethylidene norbornene (ENB), and vinyl norbornene (VNB). Another potential material may be ethylene propylene rubber, which is a copolymer of ethylene and propylene. Another potential material may be nitrile rubber, which is also known as Buna-N, Perbunan, acrylonitrile butadiene rubber, and NBR, is a synthetic rubber copolymer of acrylonitrile (ACN) and butadiene. It should be understood that other materials are also possible and within the scope of this disclosure.

In use, the air cavities 32 may be filled with an inert nonflammable gas, such as argon or nitrogen. The use of inert air may held keep any contaminants from entering or forming in the air cavities. It should be understood that the cavities may be filled with traditional atmosphere air as well, or any other appropriate fluid.

In a specific embodiment, the bladder accumulator may hold between about 8 to about 10 ounces of water (whether grey water or potable/fresh water or a mixture thereof). It should be understood that the design may be scaled up or down, to hold more or less liquid, depending upon the desired usage. The housing 12 may be designed to accommodate up to about 30 psi (pounds per square inch). An exemplary range of pressures may be anywhere from 10 to about 40 psi. In a specific embodiment tested, the accumulator could withstand up to about 128 psi, with a burst pressure of about 188 psi. Again, the system may be scaled up or down to accommodate a higher or lower pressure if desired. The accumulator may be able to handle a water pressure flow regulated to 1 GPM (gallon per minute), 2 GPM, 3 GPM, or any other appropriate flow rate.

Figure 8:
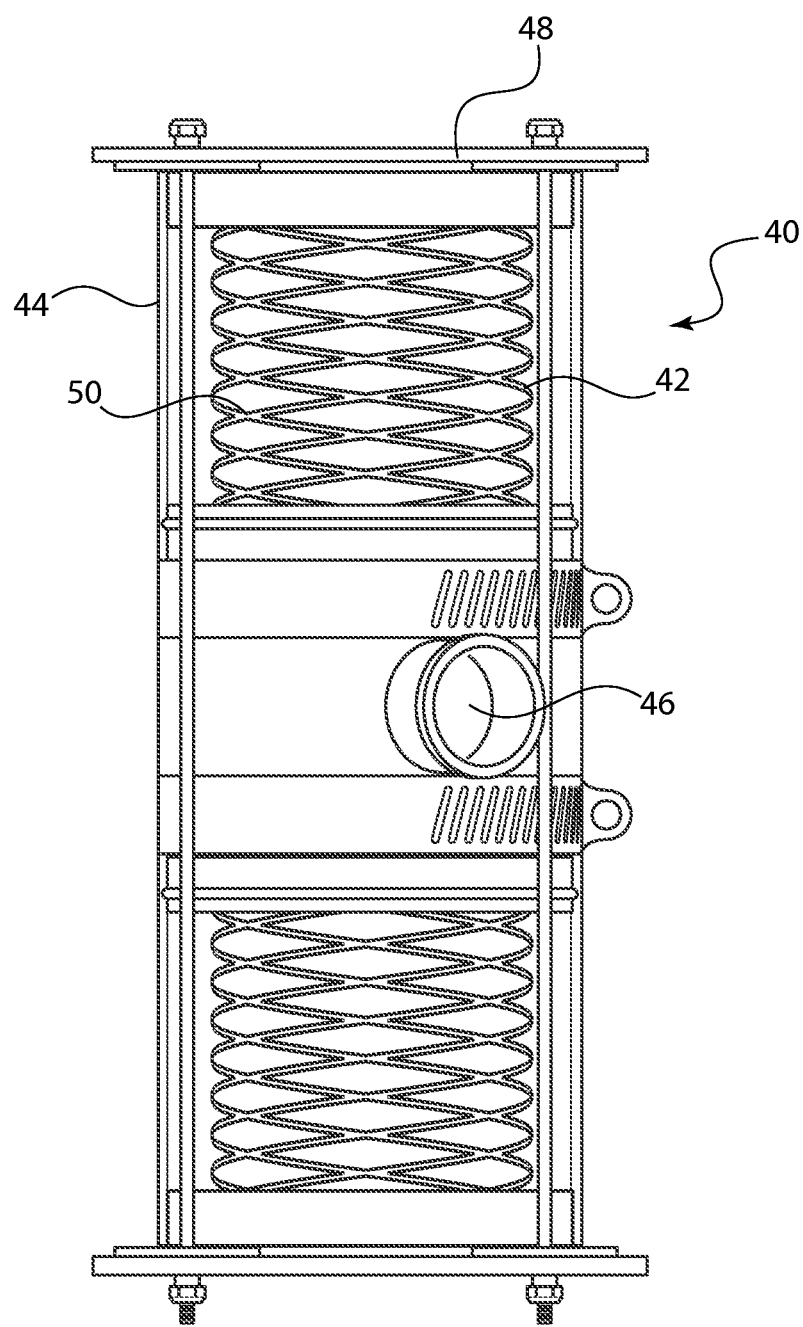
FIG. 8 shows a side view of an alternate embodiment of an accumulator that uses a spring system for use in the water flow system of FIG. 1.
Figure 9:
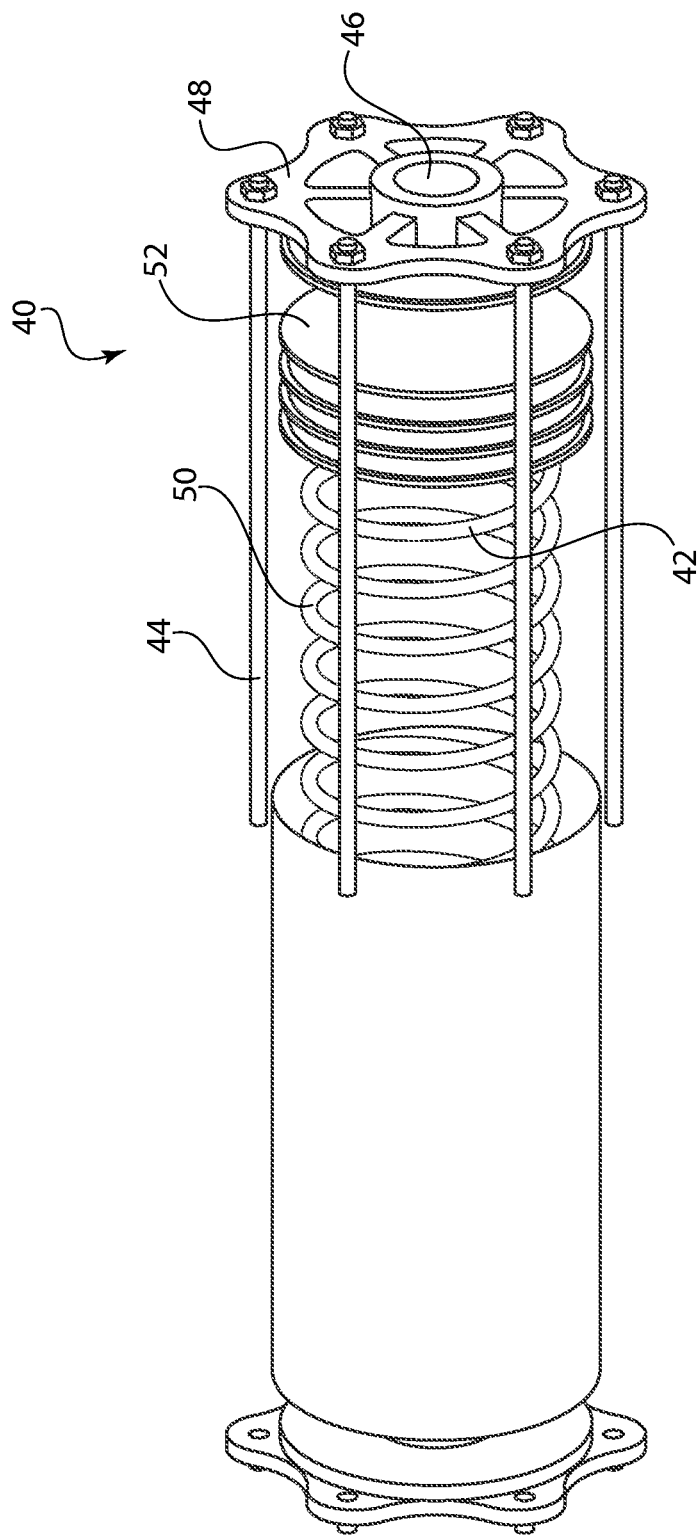
FIG. 9 shows a side view of the accumulator of FIG. 8.

FIGS. 7-11 show an alternate embodiment for an accumulator 40. In these figures, the accumulator 40 is a spring-loaded accumulator that creates pressure via use of a spring system 42. The spring-loaded accumulator 40 stores fluid as potential energy (pressure). The spring system 42 is generally contained in a housing 44 that serves as a pressure vessel with an inlet/outlet 46. In the embodiment shown in FIG. 9, the inlet/outlet 36 is supported by a cover 48, and it positioned at an upper end of the housing 44. In the embodiment of FIG. 8, the inlet/outlet 46 is positioned directly on the housing 44, along a manifold between upper and lower halves of the housing 44. The inlet/outlet may be at any position, as long as it allows inflow and outflow of liquid into the housing 44. The spring system may include a spring 50 and a spring-loaded piston 52. The spring 50 is generally a compression spring. The spring 50 may be designed such that the pressure required to compress the spring is based on the amount of fluid that the accumulator 40 is designed to hold. The size, shape, and length of the spring (e.g., the thickness of the coiled material, the shape of the material, the number of turns it features, and other aspects) may be optimized and compared against the amount of water that needs to be held and moved. For instance, on one hand, a thicker and/or longer spring can deliver more pressure, but it also takes up more volume in the interior of the accumulator 40, reducing the amount of fluid that can be accommodated. It should be understood that the design may be scaled up or down, to hold more or less liquid, depending upon the desired usage.

Figure 11:
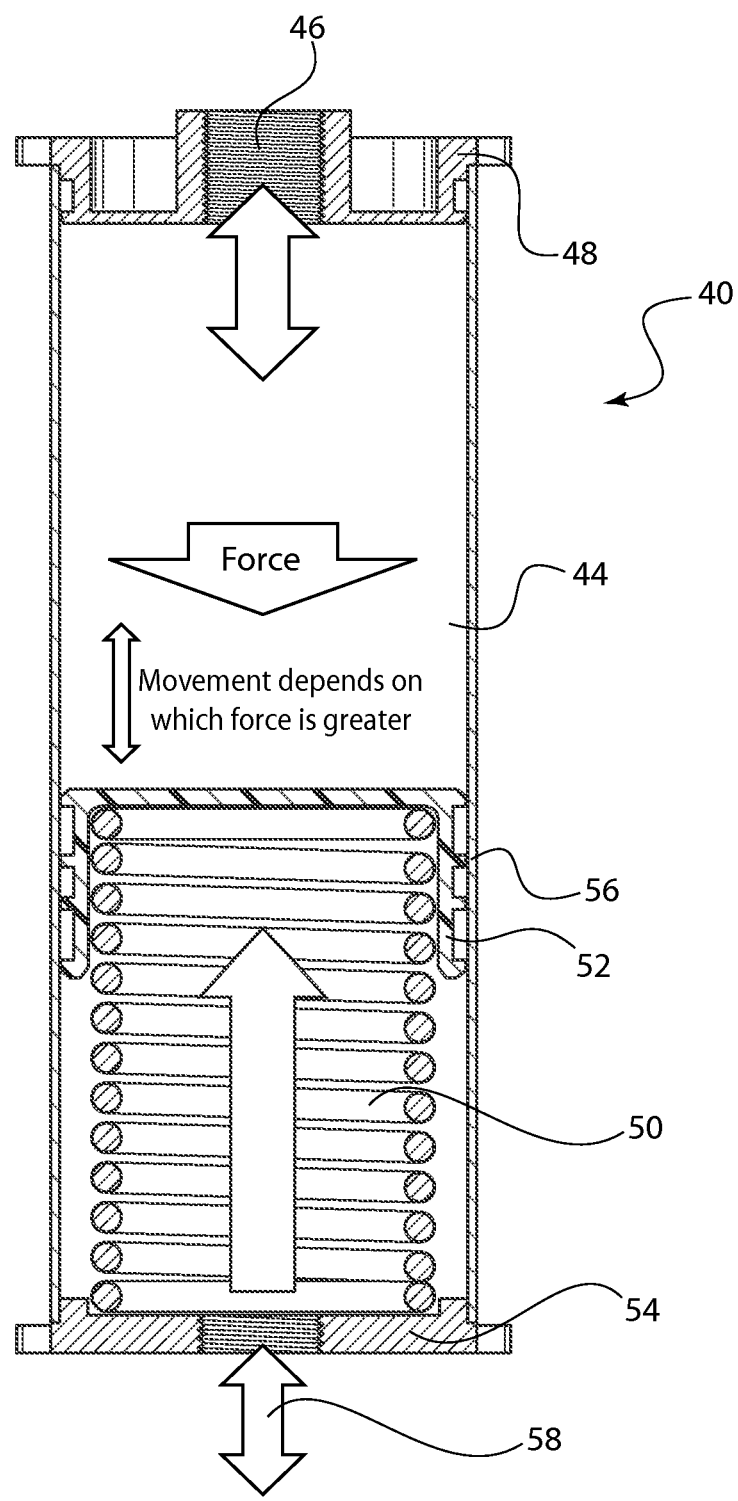
FIG. 11 shows a side perspective view of an interior of the accumulator of FIG. 8 showing various volume and pressure ratios.
Figure 12:
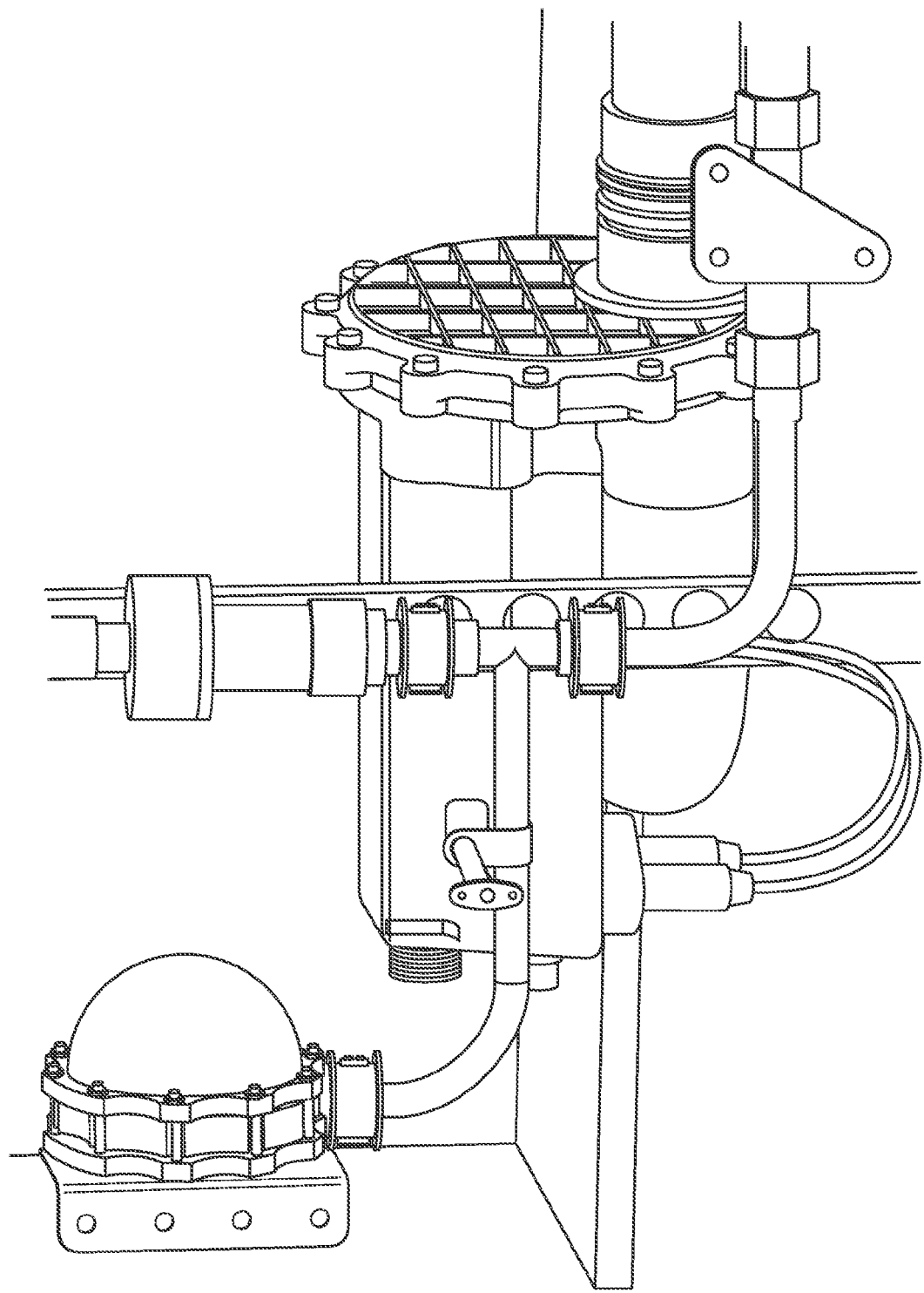
FIG. 12 shows an example of an accumulator positioned within a water flow system on board an aircraft.
Figure 13A:
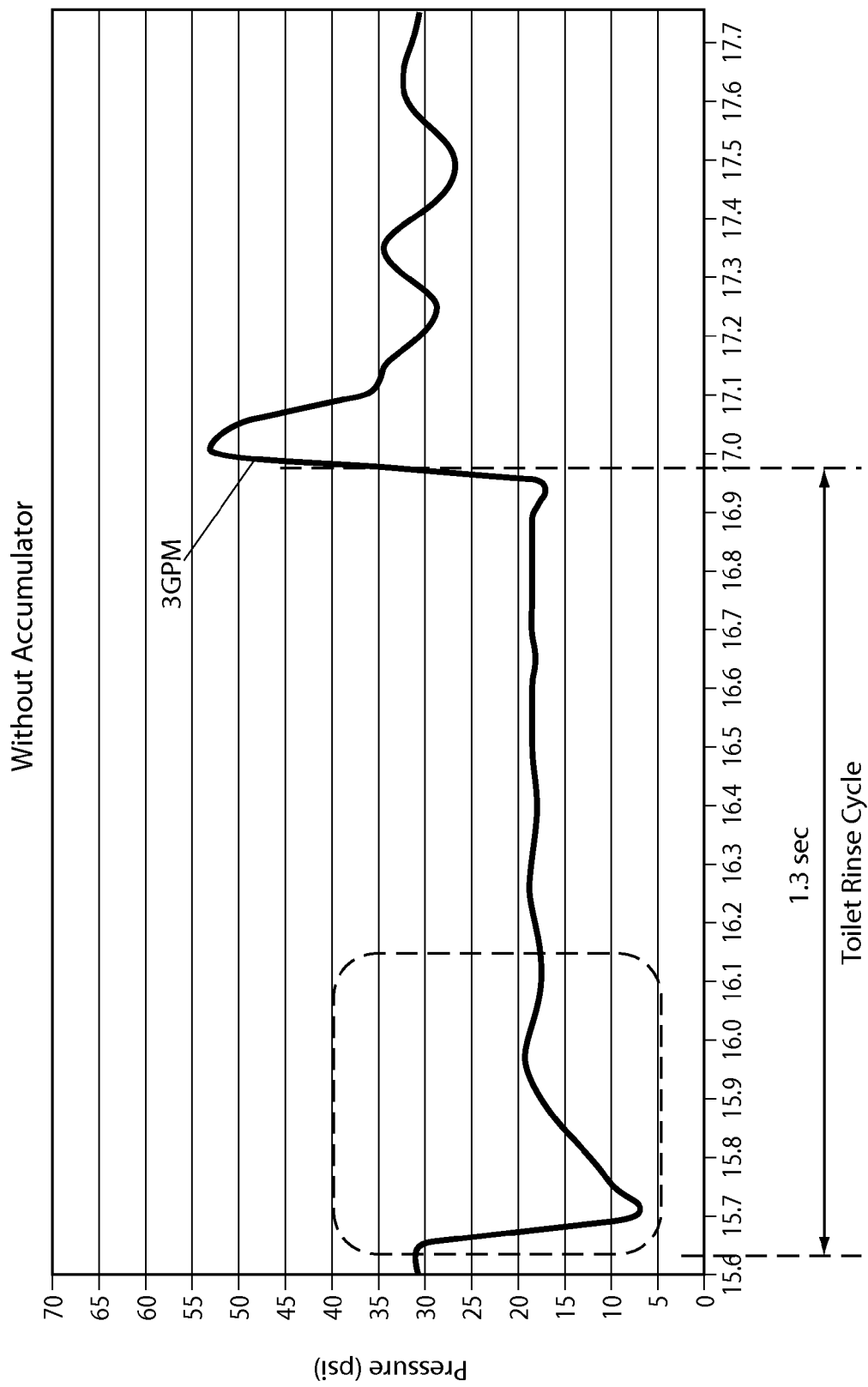
FIG. 13A is a graph showing pressure drops without the use of an accumulator.
Figure 13B:
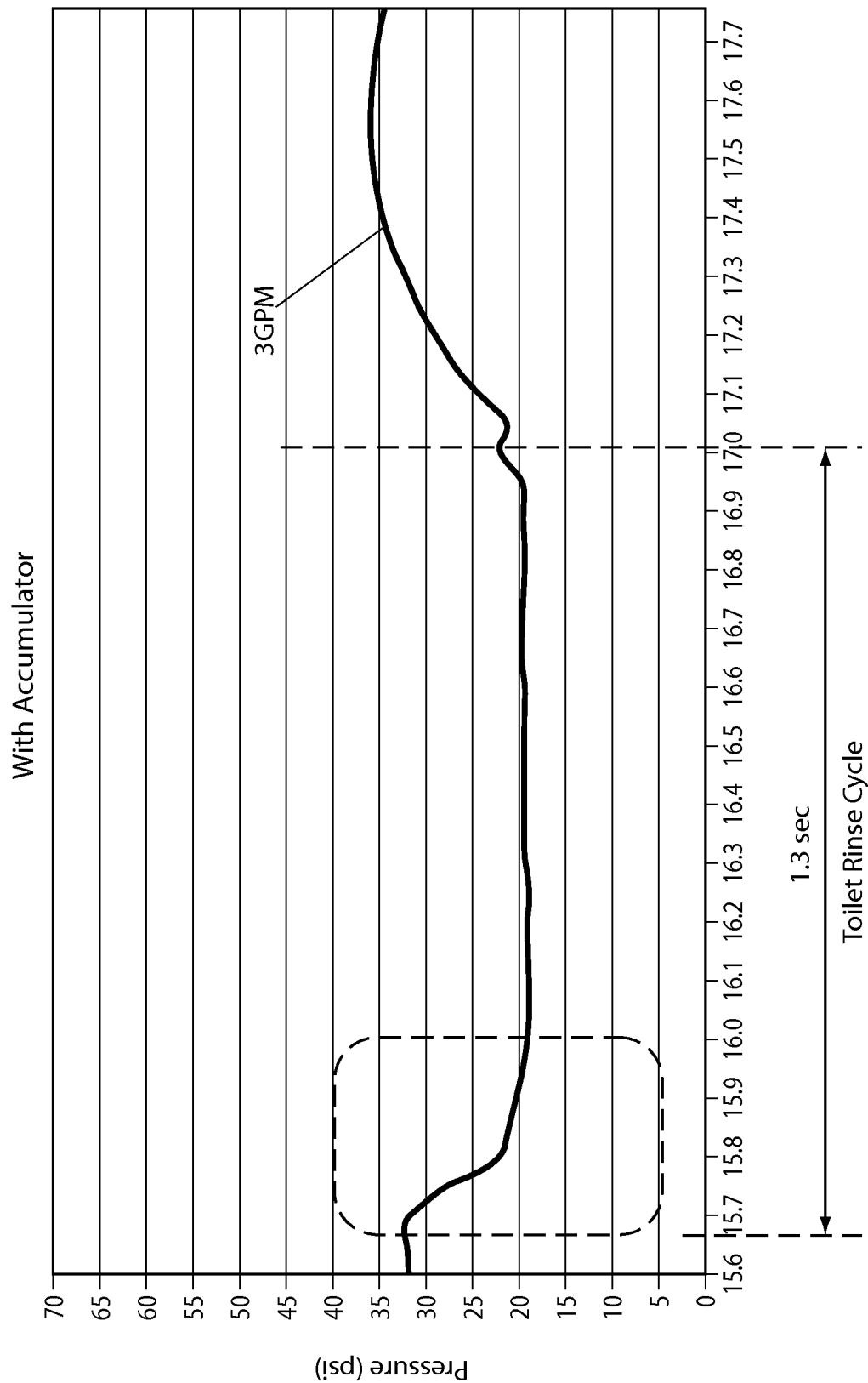
FIG. 13B is a graph showing pressure drops without the use of an accumulator.
Figure 14:
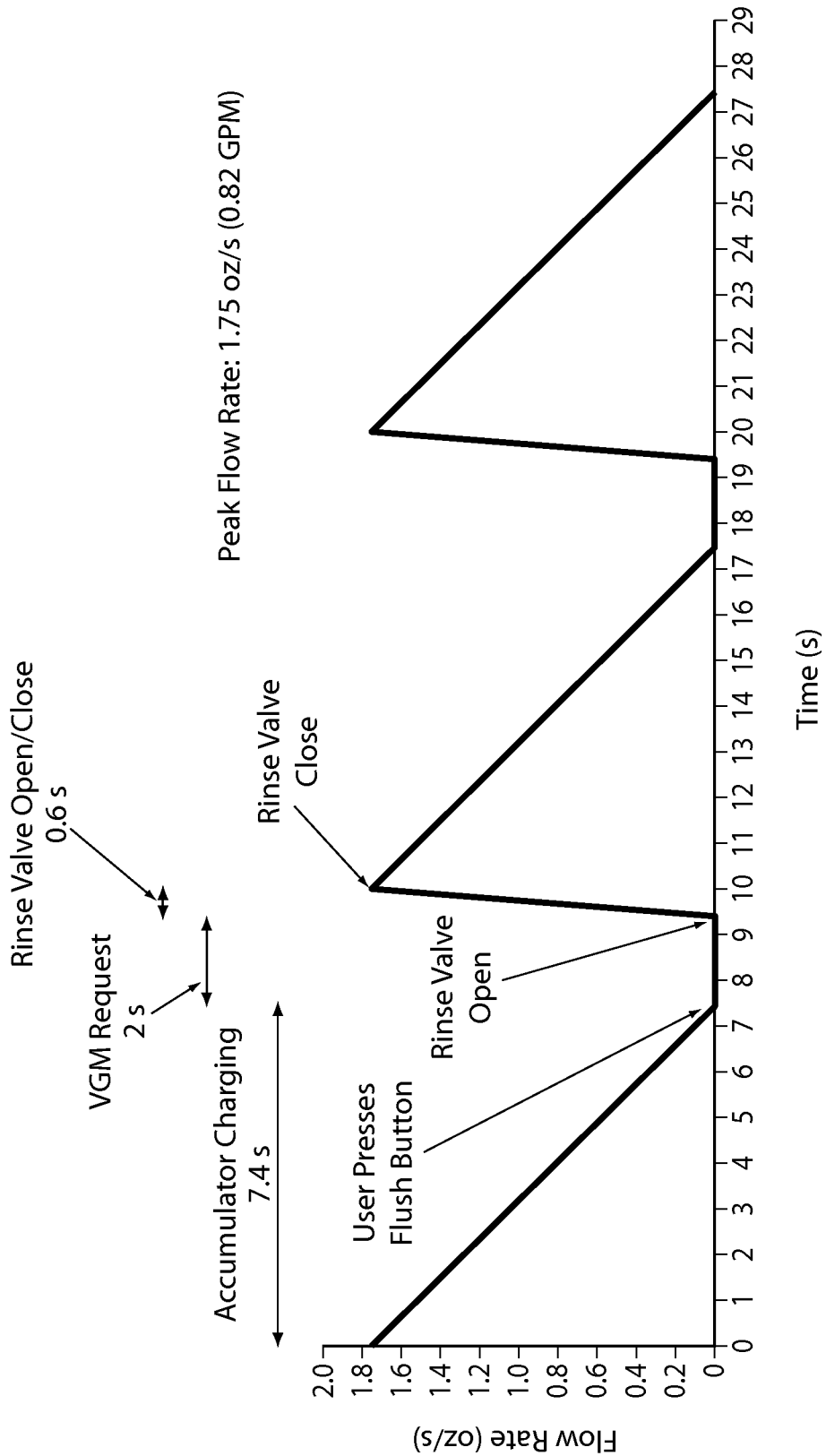
FIG. 14 is a graph that shows pump performance in the presence of an accumulator.

As shown in FIG. 11, in addition to the top cover 48, the spring-loaded accumulator 40 may also have a bottom cover 54 to contain the components within the housing 44. It may also have one or more O-rings 56. It may further be provided with a an air port 58/leak diversion system.

In a specific embodiment, the pressure delivery range of the accumulator 40 may be between about 20-45 psi. In a more specific embodiment, the pressure delivery range may be about 40 psi. It has been determined that below about 20 psi, the pressure is generally insufficient to clean a vacuum toilet, and above about 45 psi, the requirements of the pump are increased (defeating some of the advantages of providing the intermediate accumulator in the first place).

In one specific embodiment, the spring 50 may be a round spring, formed from a material that has a generally circular cross-section and then wound into a spring shape. In another embodiment, the spring 50 may be a flat spring, formed from a flat, ribbon-like material that is wound into a spring shape. Altering the spring shape and length can alter the spring constant, which determines the compression force that can be delivered by the spring system 42.

As shown in FIG. 10, when the spring 50 is not compressed, it generally fills the entire interior of the housing 44. When hydraulic pressure loads the spring 50, the spring 50 is compressed/loaded with potential force. This application of hydraulic pressure occurs when the pump delivers fluid into the inlet 46 of the accumulator 40. The pressure of the fluid against the piston 52 forces the spring 50 to be compressed. As the spring 50 is compressed, pressure builds. When a flush sequence is activated, the inlet/outlet 48 is opened. Spring pressure drives movement of the piston 52 up in order to force the fluid contained in the accumulator 40 out of the housing 44. The fluid is thus delivered to the flush ring when a flush is activated. Movement of the spring (and whether it is compressed or relaxed) depends on which force is greater—the force of water entering the accumulator or the force of the spring coils.

The spring 50 may be formed from any appropriate material. It is desirable that the material selected be able to withstand extreme temperatures (below freezing temperatures as well as very high temperatures), as well as a high number of cycles without requiring maintenance or replacement. The spring 50 may be an alloy or a combination of alloys. Non-limiting examples of potential spring materials include stainless steel, sheet metal, titanium, a resilient plastic material, or any other option.

The spring 50 may optionally be coated in order to enhance performance and to prevent wear. For example, the spring may be coated with a Teflon-like plastic material (such as PTFE, polytetrafluoroethylene) to prevent corrosion. As another example, the spring may be powder-coated to make the spring more durable and inert.

The very nature of the use of grey water can mean that particulates and other contaminants will be handled by the water flow system described. Thus, in some embodiments, one or more components of the bladder system 14 (including the interior and/or the exterior if the bladder) and/or or the spring system 42 may be treated with one or more antimicrobial or biocide compositions. The term "antimicrobial" is used herein to encompass, but not be limited to, all potential compounds that kill or inhibit the growth of bacteria, fungus, mold, mildew, parasites, microorganisms, viruses, and any other unwanted species that may grow in a space. The term is intended to encompass, but not be limited to, any types of antimicrobials, antiseptics, disinfectants, biocides, sterilizers, deodorizers, decontaminants, purifiers, or any other substances that inhibit, treat, and/or prevent or inhibit unwanted growth of any of the above-described or other species. Various types of anti-microbial chemistry are known, but non-limiting examples of potential materials that may be used may be manufactured by any number of chemical companies (non-limiting examples of which include Dow Chemical, BASF, DuPont, Microban, Total Science Antiseptic Solutions, and/or Eastman Chemical). Providing treatment with an antimicrobial can help ensure that any unclean fluid, whether air or liquid, that may come into contact with the accumulator portions does not create microbial growth.

Although certain accumulator embodiments 10, 40 have been shown and described, it should be understood that other structural options are possible. Any container that is provided between the grey water reservoir (and/or a potable water source) and a vacuum toilet and that can generate pressure can be used. Any container that generates sufficient pressure to relieve the pump requirements is considered and may be used.

Referring back to FIG. 1, when a flush sequence is activated, water that is being temporarily held in the accumulator is delivered to the distribution ring of the toilet bowl. This delivery may be controlled via activation of the second valve, shown as a solenoid valve in FIG. 1. The second valve may function based on time, such that it is open for a specified amount of time and then closes. The water delivered is the amount that is metered out during the time that the valve is open. In another embodiment, the second valve may function based on a pressure sensor, such that once the pressure of the water being delivered reaches a certain high or once the pressure of the water delivered reaches a certain pressure drop, the valve closes. It has been found that pressure generally drops toward the end of a flush, such that any water delivered toward the end of a flush may not enter the ring with sufficient force. This could be an indicator that the valve can close. In another embodiment, the second valve may function based on a water meter, such that once a specified amount of water is delivered, the valve closes. Other options are also possible and considered within the scope of this disclosure.

The flow of water into the accumulator may occur based on demand; e.g., on an as-needed basis. The pump may pump the liquid into the accumulator until the accumulator is full and the max pressure is achieved. The pump depositing water into the accumulator may turn off once a specified pressure and/or volume of water is accumulated. In one embodiment, the pump can stop and toilet rinse valve opens. The general goal may be to provide a pump that minimizes the number of components activated at the same time for power efficiency. For example, the pump may turn off once the accumulator is full, and only be activated when the flush sequence has been activated, the water has exited the accumulator, and the accumulator has been at least partially emptied. Activation of the pump can be used to re-fill the accumulator.

Alternatively, the pump may run continuously at an idle speed. However, after the accumulator is charged, it is a waste of energy to push liquid back and forward through the system (with the liquid not having anywhere to go until such time that the rinse valve opens). Accordingly, the idle speed may be triggered on or off at an appropriate time. In one embodiment, the general goal may be to provide a pump that can get started toward the end of accumulator discharge, and hence aid with pushing the last remaining liquid out of the accumulator when the accumulator pressure is dropped/dropping.

It should be understood that the systems described may be scaled up or down, depending upon the size of the vehicle to be serviced, the number of lavatories to be serviced by a single accumulator, the desired amount of water to be delivered per flush, the desired amount of water to be held by the accumulator (e.g., water for one flush or water for multiple flushes), and any other appropriate factors.

Water accumulators have been used on landing gear for dampening pressure and to provide better shock absorption. Compression of the fluid is believed to act like a rubber band in order to dampen force from wheel pressure. However, this use is to lower pressure, not to generate pressure. The accumulators described herein are provided in order to store water or other fluid and to charge that water or fluid with a pressure ahead of time. Thus, when the water of fluid is needed, it can be quickly pushed to the point of use. (In this instance, the point of use is a vacuum toilet for a toilet flush. However, it should be understood that using an accumulator to generate a pressure may be used in other instances, which are considered within the scope of this disclosure.) The accumulator functions to converse and store energy, somewhat like a battery. When that energy is needed, the water/fluid can be forced out of the accumulator, requiring less pressure from the pump associated with the system. The water accumulator system can thus include a water accumulator configured to store water under pressure and to force delivery of the water out of the accumulator upon a water request from a water-using source. One specific water-receiving source may be a vacuum toilet.

Changes and modifications, additions and deletions may be made to the structures and methods recited above and shown in the drawings without departing from the scope or spirit of the disclosure.

What is claimed is:

1. A vacuum toilet flush system, comprising:
 a water accumulator positioned with respect to a vacuum toilet bowl, the water accumulator comprising a bladder system within a housing,
 the bladder system comprising a compressible bladder configured to hold an amount of water needed for at least one toilet flush under pressure, the compressible bladder comprising a first portion comprising a half sphere and a second portion comprising a half sphere, and a manifold for sealing the first and second portions of the bladder to one another to form the compressible bladder, the manifold comprising a fluid port inlet and a fluid port outlet;
 the housing further comprising one or more pressurized air cavities surrounding the bladder system and at least one air distributor port for delivering pressurized air to the one or more pressurized air cavities;
 wherein filling the bladder system with fluid through the fluid port inlet causes the bladder system to expand and to compress pressurized air in the one or more pressurized air cavities, creating pressure against the bladder system,
 and wherein built-up pressure from the pressurized air in the one or more pressurized air cavities helps force water out of the bladder system through the fluid port outlet and to the vacuum toilet bowl for flushing, such that the accumulator delivers the water to the toilet at a pressure of about 20-45 psi.

2. The flush system of claim 1, wherein the accumulator is positioned between a grey water reservoir and the toilet bowl.

3. The flush system of claim 1, wherein the water is pressurized or otherwise forced into the toilet bowl once a flush sequence is activated.

4. The flush system of claim 1, wherein the one or more pressurized air cavities comprise first and second pressurized air cavities positioned outside the first and second bladder portions, respectively.

5. The flush system of claim 1, further comprising a pump that provides and controls the delivery of water to the accumulator.

6. The flush system of claim 1, wherein the one or more pressurized air cavities have a pre-charged pressurized state.

* * * * *